United States Patent
Ishigo et al.

(10) Patent No.: US 8,579,509 B2
(45) Date of Patent: Nov. 12, 2013

(54) SLIDING BEARING FOR INTERNAL COMBUSTION ENGINE

(75) Inventors: Osamu Ishigo, Inuyama (JP); Atsushi Okado, Inuyama (JP)

(73) Assignee: Daido Metal Company Ltd., Naka-Ku, Nagoya (JP)

(*) Notice: Subject to any disclaimer, the term of this patent is extended or adjusted under 35 U.S.C. 154(b) by 580 days.

(21) Appl. No.: 12/855,438

(22) Filed: Aug. 12, 2010

(65) Prior Publication Data
US 2011/0058761 A1 Mar. 10, 2011

(30) Foreign Application Priority Data
Sep. 10, 2009 (JP) ................................ 2009-209173

(51) Int. Cl.
*F16C 9/02* (2006.01)
(52) U.S. Cl.
USPC .......................................... 384/288; 384/294
(58) Field of Classification Search
USPC .................. 384/286, 288, 291, 294, 428, 429
See application file for complete search history.

(56) References Cited

U.S. PATENT DOCUMENTS

| | | | | |
|---|---|---|---|---|
| 5,009,522 A | * | 4/1991 | Hahn | 384/288 |
| 6,273,612 B1 | * | 8/2001 | Ono et al. | 384/276 |
| 6,695,482 B2 | * | 2/2004 | Niwa et al. | 384/294 |
| 2008/0187259 A1 | | 8/2008 | Ishigo et al. | |

FOREIGN PATENT DOCUMENTS

| | | |
|---|---|---|
| JP | 8277831 A | 10/1996 |
| JP | 2002188624 A | 7/2002 |
| JP | 2005069283 A | 3/2005 |
| JP | 2008082355 A | 4/2008 |

* cited by examiner

*Primary Examiner* — Thomas Diaz
(74) *Attorney, Agent, or Firm* — Browdy and Neimark, PLLC

(57) ABSTRACT

Disclosed is a sliding bearing for an internal combustion engine for supporting a crankshaft including a pair of semi-cylindrical bearings combined with each other into a cylindrical body. Each of inner circumferential surfaces of the respective semi-cylindrical bearings includes first and second curved surfaces following two kinds of arcs with different curvatures. The first curved surface is in a region including a circumferential central portion of the inner circumferential surface. The second curved surfaces are in remaining two regions of the inner circumferential surface. The circumferential oil groove and the axial groove communicate with each other. The circumferential grooves of the second curved surfaces and the axial groove communicate with each other. The groove bottoms of the circumferential grooves of the second curved surfaces are displaced to a side of the bearing inner circumferential surface from a groove bottom of the axial groove.

6 Claims, 3 Drawing Sheets

SLIDING BEARING FOR INTERNAL COMBUSTION ENGINE

INCORPORATION BY REFERENCE

The present application claims priority from JP Patent Application Ser. No. 2009-209173 filed on Sep. 10, 2009, the content of which is hereby incorporated by reference into this application.

BACKGROUND OF THE INVENTION (1) Field of the Invention

The present invention relates to a sliding bearing for an internal combustion engine in which a pair of semi-cylindrical bearings is combined with each other into a cylindrical shape to support a crankshaft.

(2) Description of the Related Art

Conventionally, a sliding bearing formed into a cylindrical shape by combining two semi-cylindrical bearings is used for a crankshaft. A circumferential oil groove is formed on a bearing inner surface of at least one of a pair of semi-cylindrical bearings, and oil is supplied to an outer circumferential surface of a crankpin via the circumferential oil groove (see JP-A-8-277831).

Meanwhile, in recent years, in order to decrease the leakage amount of lubricant oil from the bearing end portion in response to reduction in size of oil pump for supplying the lubricant oil, it has been proposed to form a narrowed portion in which the sectional area of the oil groove is reduced toward the end portion of the bearing from the bearing central portion, and to remove a crush relief by forming a circumferential oil groove machined by boring on an inner surface of the circumferential end portion of the bearing (see JP-A-2005-69283 and JP-A-2002-188624).

Also, in order to discharge foreign matters accompanying the lubricant oil and entering the sliding surface of the bearing, a bearing is proposed in which a clearance for discharging the foreign matters is formed on the inner surface of the both circumferential end portions of semi-cylindrical bearing (see JP-A-2005-69283 and JP-A-2008-82355).

BRIEF SUMMARY OF THE INVENTION

With regard to supply of lubricant oil to a sliding bearing for an internal combustion engine, the lubricant oil is first supplied from an outside of the sliding bearing for the crankshaft into the circumferential oil groove which is formed on the inner surface of the sliding bearing for the crankshaft. Next, the lubricant oil is supplied to the sliding surface of the sliding bearing for the crankshaft, and the sliding surface of a sliding bearing for a crankpin.

At the time of the initial operation of an internal combustion engine, foreign matters remaining in the lubricant oil path tend to enter the lubricant oil which is supplied to the circumferential oil groove of the sliding bearing for the crankshaft. The foreign matters mean metalwork chippings produced during the cutting work of the oil path, molding sand used in casting process, and the like. Foreign matters accompany the flow of the lubricant oil due to the rotation of the crankshaft. In the conventional sliding bearing for an internal combustion engine, foreign matters are discharged to the outside of the bearing together with the lubricant oil through clearance portions in a crush relief, a chamfer, and the like which are formed at the circumferential end portion of the bearing. However, since the rotational speed of the crankshaft in the internal combustion engines has been increased recently, the inertia force becomes large which acts on the foreign matters having specific gravities larger than that of the lubricant oil (foreign matters move forward along the circumferential direction by the inertia force). Therefore, the foreign matters are not discharged from the clearance portion in the combined end surfaces of the sliding bearing (combined end surfaces of a pair of semi-cylindrical bearings), and enter the sliding surface of the sliding bearing (the other semi-cylindrical bearing) which does not have an oil groove. This increases the possibility of damage of the bearing sliding surface due to the foreign matters.

Meanwhile, sliding bearings are proposed in which a narrowed portion is formed in the oil groove in the circumferential end portion of a semi-cylindrical bearing, in order to decrease the leakage amount of the lubricant oil from the circumferential end portion of the bearing (see JP-A-2005-69283). Studying these sliding bearings from the viewpoint of the aforementioned foreign matters, there is the problem that the flow velocity of the lubricant oil increases at the downstream of the narrowed portion with respect to the flowing direction of the lubricant oil, and then the aforementioned inertia force which acts on the foreign matters accompanying the lubricant oil becomes larger correspondingly, and this further increases the possibility of the entry of the foreign matters to the bearing sliding portion of the other semi-cylindrical bearing in which the oil groove is not formed.

Thus, an object of the present invention is to provide a sliding bearing for an internal combustion engine, which is excellent in capability of discharging foreign matters.

In view of the above described object, according to the present invention, there is provided a sliding bearing for an internal combustion engine for supporting a crankshaft, composed of a pair of semi-cylindrical bearings combined with each other into a cylindrical body to support a crankshaft, a circumferential oil groove being formed to extend in a circumferential direction on an inner circumferential surface of one of the semi-cylindrical bearings. Each of inner circumferential surfaces of the respective semi-cylindrical bearings includes first and second curved surfaces following two kinds of arcs with different curvatures. The first curved surface is in a region including a circumferential central portion of the inner circumferential surface. The second curved surfaces are in remaining two regions of the inner circumferential surface which connect to the first curved surface region and extend toward both circumferential ends of the semi-cylindrical bearing. A relationship of a center (C1) of a first arc which forms the first curved surface and a center (C2) of a second arc which forms the second curved surface is such that the center (C2) of the second arc is located on a perpendicular line to a bearing bore diameter center line passing through the center (C1) of the first arc, and is located outside from the center (C1), that is, is located at a position displaced to a side of the semi-cylindrical bearing which is a counterpart to be combined. The second curved surfaces are formed in a region in which a circumferential angle (θ) is between 20° at a minimum value and 50° at a maximum value. The circumferential angle (θ) is measured from a circumferential end surface of each of the semi-cylindrical bearings with the center (C1) of the first arc as a center. The inner circumferential surface comprising the first and the second curved surfaces is a sliding surface in which a number of microscopic circumferential grooves are formed. The groove depths of the circumferential grooves of the second curved surfaces are larger than the groove depths of the circumferential grooves of the first curved surface. A bearing wall thickness (W1) in the circumferential central portion of the semi-cylindrical bearing is larger than a bearing wall thickness (W2) in a circumferential end portion. An axial groove for a lubricant oil extending over an entire width of the sliding bearing exists along both butted end surfaces of the pair of semi-cylindrical bearings which are combined into a cylindrical shape. The circumferential oil groove and the axial groove communicate with each other. A cross-sectional area of the circumferential oil groove in the communication portion is larger than a cross-sectional area of the axial groove. The circumferential grooves of the second curved surfaces and the axial groove communicate with each other. The groove depths of the circumferential grooves of the second curved surfaces and the axial groove in the communication portion are different from each other. The groove bottoms of the circumferential grooves of the second curved surfaces are displaced to a side of the bearing inner circumferential surface from a groove bottom of the axial groove. The axial groove is defined by a slant surface extending from the inner circumferential surface of at least one semi-cylindrical bearing of the pair of the semi-cylindrical bearings to the circumferential end surface.

The foreign matters which accompany the lubricant oil and enter the circumferential oil groove reach the end portion of the circumferential oil groove located at the position in the same direction as the relative rotational direction of the crankshaft by the lubricant oil flow in the circumferential oil groove by rotation of the crankshaft. However, when the axial groove which is the discharge passage for the foreign matters does not exist at the circumferential end portion of the semi-cylindrical bearing (JP-A-2002-188624), the foreign matters reach the inner circumferential surface of the other semi-cylindrical bearing, which is the combination counterpart and is located beyond the end portion of the circumferential oil groove. As a result, the foreign matters are locally embedded and accumulated in the inner circumferential surface.

Further, even if the axial groove for discharging foreign matters is formed in the circumferential end portion of the semi-cylindrical bearing, the open portion of the end portion of the circumferential oil groove is closed by the circumferential end surface of the other semi-cylindrical bearing which does not form the circumferential oil groove. Therefore, the foreign matters float and approach the crankshaft surface, and thereafter, enter the axial groove. However, before some of the aforementioned floating foreign matters enter the axial groove, they are forced to flow by the lubricant oil flow in the circumferential direction in the vicinity of the crankshaft surface, and reach the inner circumferential surface of the other semi-cylindrical bearing, which is the combination counterpart located and is located beyond the end portion of the circumferential oil groove. Then, they are locally embedded and accumulated in the inner circumferential surface. When local embedment and accumulation of the foreign matters occurs in the inner circumferential surface of the bearing, there arises the fear that the foreign matters and crankshaft are brought into contact with each other to generate heat and cause seizure.

According to the present invention, such a problem of the related art can be solved.

More specifically, the semi-cylindrical bearing is configured such that each of inner circumferential surfaces of a pair of semi-cylindrical bearings is constituted of first and second curved surfaces following two kinds of arcs with different curvatures, the first curved surface is in a region including a circumferential central portion of the aforementioned inner circumferential surface, and the second curved surfaces connect to the first curved surface region and extend toward both circumferential ends of the semi-cylindrical bearing. Therefore, the lubricant oil and some of the foreign matters in the circumferential oil groove tend to be also dispersed and flow into a gap formed by the second curved surface and the crankshaft surface. Therefore, the phenomenon apt to be occurred in the related art can be suppressed that the foreign matters reach the inner circumferential surface of the semi-cylindrical bearing, which is the combination counterpart located beyond the end portion of the circumferential oil groove, and are locally embedded and accumulated in the inner circumferential surface.

A number of microscopic circumferential grooves are usually formed on the inner circumferential surface of the bearing composed of the second curved surface. The lubricant oil which is dispersed and flows into the gap made by the second curved surface and the crankshaft surface and the foreign matters accompanying the lubricant oil are guided to the circumferential grooves, and reach the circumferential end surface of the semi-cylindrical bearing. Therefore, the leakage amount of the lubricant oil from the gap formed by the second curved surface is small.

The second curved surface is formed so that a circumferential angle ($\theta$) is between 20° at a minimum value and 50° at a maximum value. The circumferential angle ($\theta$) is measured from a circumferential end surface of the semi-cylindrical bearing with the center (C1) of the first arc as a center. If the circumferential angle ($\theta$) measured from the circumferential end surface is less than 20°, the circumferential length of the second curved surface is small, and dispersion of the foreign matters in the circumferential oil groove into the gap portion is insufficient. If the circumferential angle ($\theta$) exceeds 50°, the area of the first curved surface of the semi-cylindrical bearing which receives a large load by operation of the internal combustion engine becomes too small.

About the depths of a number of microscopic circumferential grooves which are formed on the aforementioned inner circumferential surface composed of the first and second curved surfaces, the groove depths of the circumferential grooves of the second curved surfaces are made larger than the groove depths of the circumferential grooves of the first curved surface.

In order to enhance the load capacity by facilitating oil film formation for the first curved surface which receives a large load by the operation of the internal combustion engine, the depths of the circumferential grooves of the first curved surface are preferably made smaller than the depths of the circumferential grooves of the second curved surface.

An axial groove for a lubricant oil extending all over the entire width of the sliding bearing exists along both butted end surfaces of a pair of semi-cylindrical bearings which are combined into a cylindrical shape. The circumferential oil groove, the circumferential grooves on the second curved surfaces and the axial groove communicate with one another. By this configuration, the foreign matters which flow out of the circumferential oil groove and the circumferential grooves on the second curved surfaces flow into the axial groove for the lubricant oil, and are discharged to the outside of the bearing.

In the communication portion of the circumferential oil groove and the axial groove, a cross-sectional area of the circumferential oil groove is made larger than a cross-sectional area of the aforementioned axial groove, and the flow velocity of the lubricant oil in the axial groove for the lubricant oil is high as compared with the flow velocity of the lubricant oil in the circumferential oil groove. Thus, the foreign matters hardly receive the influence of the flow of the lubricant oil flowing in the circumferential direction along the bearing inner circumferential surface with the rotation of the crankshaft. Therefore, the possibility is reduced that the foreign matters are forced out from the inside of the axial groove for the lubricant oil and move to the inner circumferential surface of the bearing, and thereby, enter the space between the sliding surfaces of the sliding bearing and the crankshaft.

Further, the circumferential grooves of the second curved surfaces and the axial groove for the lubricant oil communicate with each other. The groove depths of the circumferential grooves and the axial groove for the lubricant oil in the communication portion are different from each other. The groove bottoms of the circumferential grooves are displaced to a bearing inner circumferential surface side from the groove bottom of the axial groove for the lubricant oil. By the aforementioned configuration in which the groove depth of the axial groove for the lubricant oil is made large as compared with the groove depths of the circumferential grooves, the foreign matters which tend to move along the circumferential grooves directly enter the axial groove for the lubricant oil with a higher flow velocity of the lubricant oil as described above in the communication portion. Therefore, the foreign matters hardly receive the influence of the flow of the lubricant oil flowing in the circumferential direction along the inner circumferential surface of the bearing with rotation of the crankshaft. Therefore, the phenomenon apt to be occurred in the related art can be suppressed that the foreign matters reach the inner circumferential surface of the semi-cylindrical bearing, which is the combination counterpart located beyond the end portion of the circumferential oil groove, and are locally embedded and accumulated in the inner circumferential surface.

In a preferred embodiment of the present invention, the circumferential grooves of the second curved surface are formed to have groove depths of between 4 μm and 15 μm with pitches of between 0.1 mm and 0.8 mm, and the circumferential grooves of the first curved surface are formed to have groove depths of 3 μm or less with pitches of between 0.1 mm and 0.8 mm.

In order to guide the lubricant oil and foreign matters, which are dispersed into the gap portion made by the second curved surface and the crankshaft, to the axial groove for the lubricant oil, the circumferential grooves may be formed to have the groove depths of between 4 μm and 15 μm with pitches of between 0.1 mm and 0.8 mm. If the depths of the circumferential grooves are less than 4 μm and the pitches of the circumferential grooves (circumferential groove widths) are less than 0.1 mm, the lubricant oil and the foreign matters easily go out from the inside of the circumferential grooves. If the circumferential groove depths exceed 15 μm, and the pitches (circumferential groove widths) of the circumferential grooves exceed 0.8 mm, the cross-sectional area per one ridge in the vicinity of the apex of the crest portion of each of the circumferential grooves becomes too large, and when contact with the crankshaft occurs, the apex of the crest portion hardly wears to reduce conformability of the bearing.

The circumferential grooves of the first curved surface are made to have groove depths of 3 μm or less with pitches of between 0.1 mm and 0.8 mm. By the configuration, an oil film is easily formed on the first curved surface, and load capacity can be enhanced.

In another preferred embodiment of the present invention, a difference "W1-W2" between the bearing wall thickness (W1) in the circumferential central portion of the semi-cylindrical bearing and the bearing wall thickness (W2) in the circumferential end portion is between 5 μm and 30 μm. If the aforementioned difference is less than 5 μm, the effect cannot be expected that the lubricant oil and foreign matters in the circumferential oil groove are dispersed and flow into the gap portion made by the second curved surfaces and the crankshaft. Further, if the aforementioned difference exceeds 30 μm, the leakage amount of the lubricant oil to the outside of the bearing from the gap portion made by the second curved surface and the crankshaft increases. In order to decrease the leakage amount of the lubricant oil from the aforementioned gap portion, the aforementioned difference is preferably 15 μm or less.

DETAILED DESCRIPTION OF THE INVENTION

Example

Hereinafter, an embodiment of the present invention will be described with reference to the attached drawings.

Figure 1:
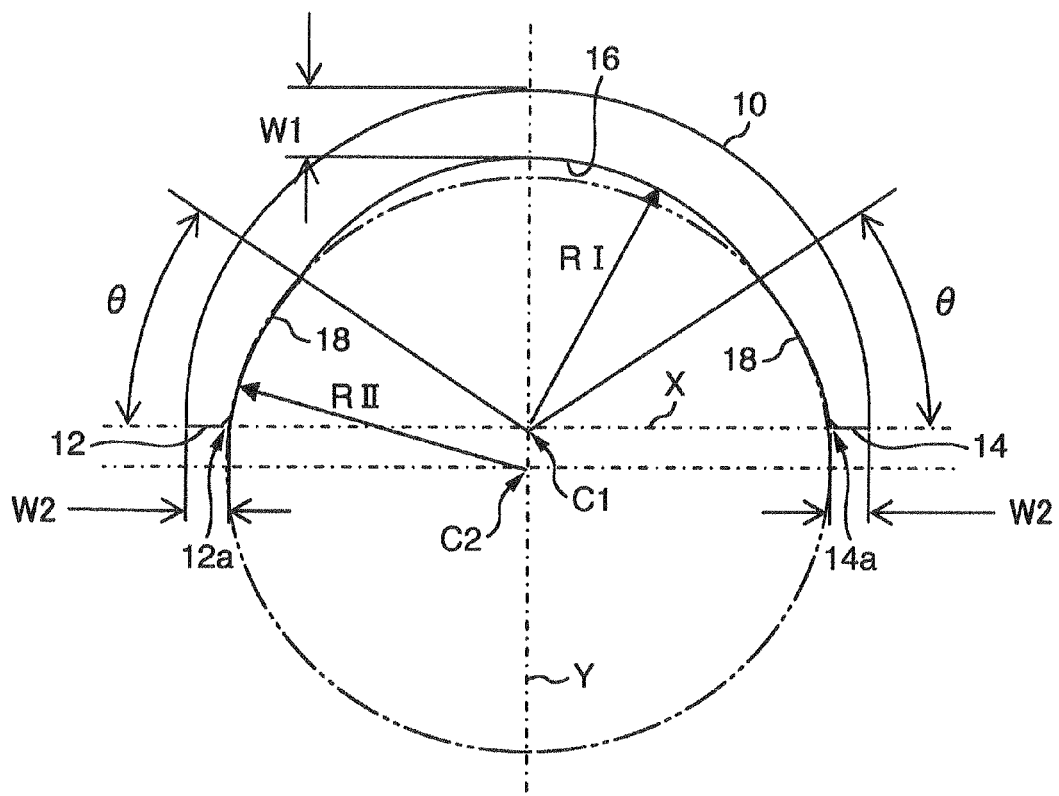
FIG. 1 is a front view of a semi-cylindrical bearing for supporting a crankshaft according to one embodiment of the present invention.
Figure 2:
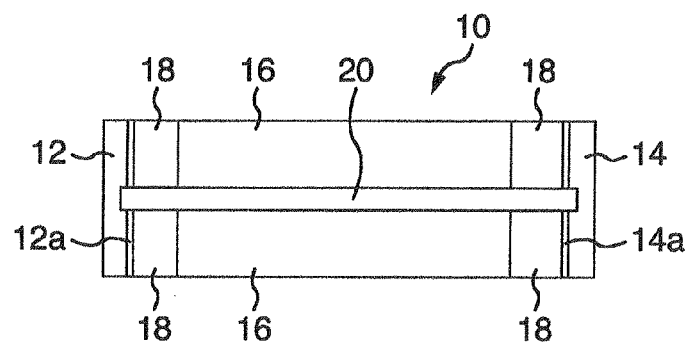
FIG. 2 is a view showing an inner circumferential surface of the semi-cylindrical bearing shown in FIG. 1.
Figure 3:
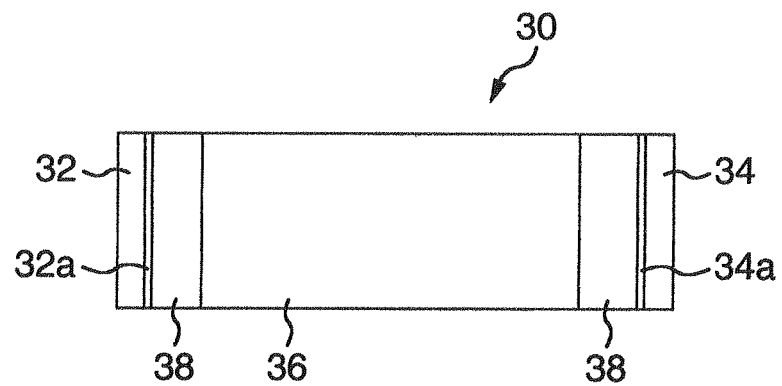
FIG. 3 is a view showing an inner circumferential surface of the other semi-cylindrical bearing which is the counterpart of the semi-cylindrical bearing shown in FIGS. 1 and 2.

FIG. 1 is a view showing a semi-cylindrical bearing 10 for supporting a crankshaft of an internal combustion engine according to one embodiment of the present invention, which is shown from its axial direction. FIG. 2 is a view showing a bearing inner circumferential surface of the semi-cylindrical bearing 10. The semi-cylindrical bearing 10 is combined with the other semi-cylindrical bearing 30 (FIG. 3) in a substantially the same shape into a cylindrical shape to be a sliding bearing for a crankshaft. The difference between the both semi-cylindrical bearings 10 and 30 is that a circumferential oil groove 20 is formed in the central portion of the bearing width of the inner circumferential surface of the semi-cylindrical bearing 10 all over the entire length in the circumferential direction. The other structures of the both semi-cylindrical bearings 10 and 30 are not different from each other.

The bearing inner circumferential surface of the semi-cylindrical bearing 10 is formed by two kinds of arc surfaces with different curvatures. They are a first curved surface 16 located in a central region of the length in the circumferential direction of the bearing, and a second curved surfaces 18 which connect to both end portions in the circumferential direction of the bearing of the first curved surface 16. The bearing inner circumferential surface of the semi-cylindrical bearing 30 is formed by a first curved surface 36 and second curved surfaces 38, which are similar arc surfaces.

The semi-cylindrical bearing 10 will be described.

In FIG. 1, the center of the arc surface of the first curved surface 16 is represented by C1, and the center of the arc surface of the second curved surface 18 is represented by C2. In FIG. 1, a virtual straight line (X) passing through both circumferential end surfaces 12 and 14 of the semi-cylindrical bearing 10 is drawn, and a virtual straight line Y which is perpendicular to the virtual straight line X and bisects the circumferential length of the semi-cylindrical bearing 10 is drawn. The point of intersection of the virtual straight lines X and Y is the axial line position of the semi-cylindrical bearing 10 (sliding bearing), and is also the arc surface center C1 of the first curved surface 16. The first curved surface 16 is an arc surface with a radius RI with C1 as the center. The arc surface center C2 of the second curved surface 18 is on the virtual straight line Y, and is in the position displaced to the outside of the semi-cylindrical bearing 10 with respect to the arc surface center C1 of the first curved surface 16. The second curved surface 18 is the arc surface with a radius RII with C2 as the center. The radius RII is larger than the radius RI.

Further, the second curved surfaces 18 are formed in the range in which a circumferential angle (θ) becomes between 20° at a minimum value and 50° at a maximum value. The center of the circumferential angle (θ) is C1, which is the axial line position of the semi-cylindrical bearing 10 and is also the arc surface center of the first curved surface 16, and the measurement reference point of the circumferential angle (θ) is ether of the both circumferential end surfaces 12 and 14 of the semi-cylindrical bearing 10.

The semi-cylindrical bearing 10 which is formed to have the above shape characteristics has such a shape that the wall thickness of the region corresponding to the second curved surface 18 gradually decreases toward the both circumferential end surfaces 12 and 14 with respect to a wall thickness (W1) of the region corresponding to the first curved surface 16 to be a minimum wall thickness (W2) at the positions of the end surfaces 12 and 14. However, the following points should be noted with regard to the wall thickness (W2).

Further, at the both circumferential end surfaces 12 and 14 of the semi-cylindrical bearing 10, corner edge portions which are formed by the end surfaces 12 and 14 and the second curved surfaces 18 are removed by chamfering, and slant surfaces 12a and 14a are formed. In the case of the semi-cylindrical bearing 30, corner edge portions formed by end surfaces 32 and 34 and the second curved surfaces 38 are removed by chamfering all over the entire width of the bearing, and slant surfaces 32a and 34a are formed.

Figure 4:
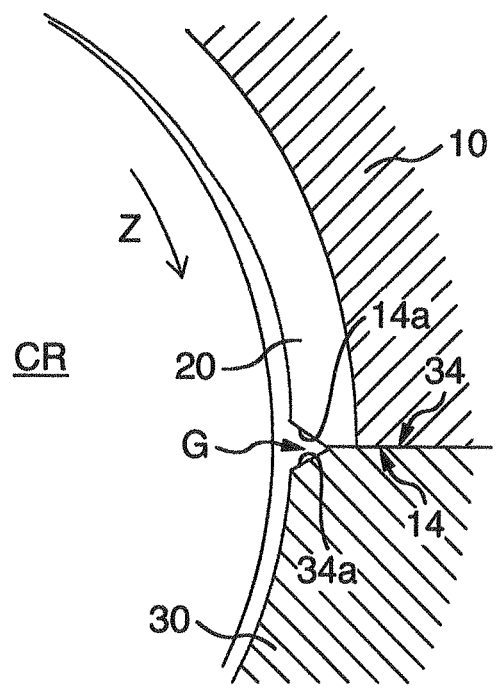
FIG. 4 is a view showing butted portions of a pair of semi-cylindrical bearings shown in FIGS. 1 to 3 together with a crankshaft at a location where a circumferential oil groove is present.
Figure 5:
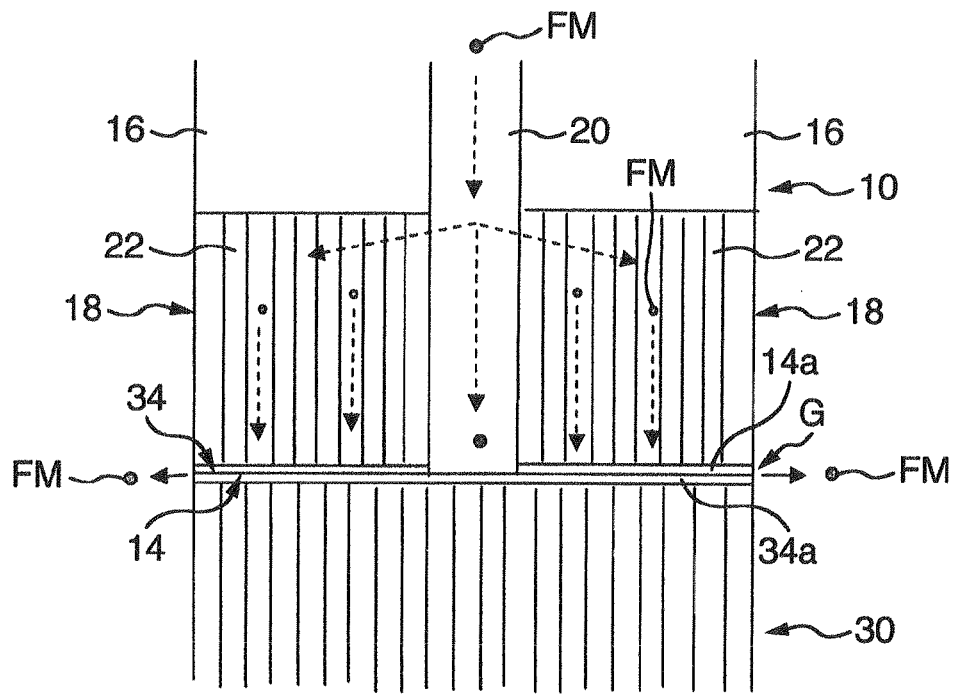
FIG. 5 is a schematic view locally showing the inner circumferential surfaces of a pair of semi-cylindrical bearings shown in FIG. 4.

As a result, an axial groove G with a V-shaped section extending over the entire length of the bearing width is defined in the butted portions of both of the semi-cylindrical bearings 10 and 30, when the semi-cylindrical bearings 10 and 30 are combined into a cylindrical shape (FIGS. 4 and 5).

The wall thickness (W2) in the both circumferential end surfaces 12 and 14 of the semi-cylindrical bearing 10 is described above. However, when the slant surfaces 12a and 14a are formed at the portions of the end surfaces 12 and 14, an accurate wall thickness cannot be actually measured. Accordingly, in the present description and claims, the wall thickness (W2) is defined as the thickness on the assumption that the slant surfaces 12a and 14a are not formed and the corner edges exist.

[Function of the Axial Groove G]

In FIGS. 4 and 5, the lubricant oil and accompanying foreign matters FM in the circumferential oil groove 20 move toward the circumferential end surface 14 with rotation of a crankshaft CR (rotational direction Z). In the circumferential end surface 14, the axial groove G defined by the slant surfaces 14a and 34a exists, and the lubricant oil and the foreign matters FM flow into the axial groove G. At the location where the circumferential oil groove 20 communicates with the axial groove G, the cross-sectional area of the axial groove G is formed to be smaller than the cross-sectional area of the circumferential oil groove 20. And then, the moving speed of the lubricant oil and the foreign matters FM which flow into the axial groove G becomes higher than the moving speed in the circumferential oil groove 20. Therefore, the lubricant oil and the foreign matters FM mainly follow the flow in the axial groove G and are discharged to the outside of the bearing from the end surface portions in the bearing width direction.

Figure 6:
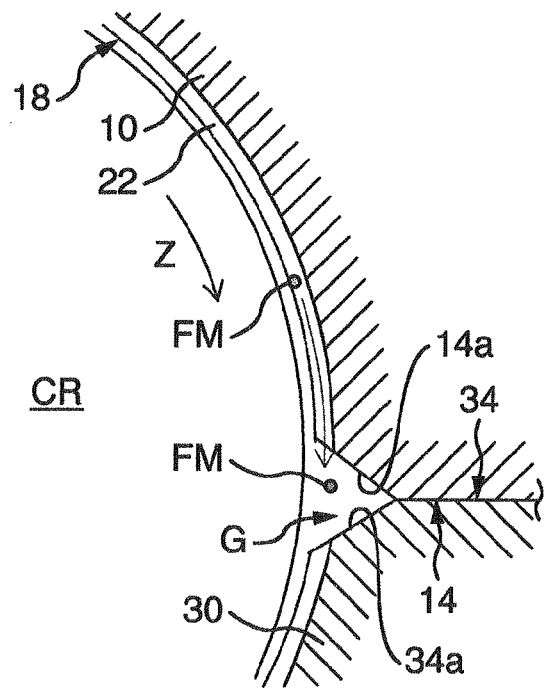
FIG. 6 is a view similar to FIG. 4 and showing the butted portions of a pair of semi-cylindrical bearings shown in FIGS. 1 to 3 together with the crankshaft at the location where the circumferential groove is present.

Further, the second curved surface 18 has large radius of curvature as compared with the first curved surface 16. A gap formed by the second curved surface 18 and the outer circumferential surface of the crankshaft CR is relatively large. Thus, the lubricant oil and accompanying foreign matters FM which flow in the circumferential oil groove 20 are dispersed and flow to the outside of the circumferential oil groove 20, and are guided to a number of microscopic circumferential grooves 22 (work trace which is generated at the time of cutting work) which are present on the second curved surface 18 as shown in FIG. 5, and then flow into the axial groove G. At the communication portion of the circumferential groove 22 and the axial groove G, the groove depth of the axial groove G with reference to the second curved surface 18 is large as compared with the groove depth of the circumferential groove 22. The foreign matters FM which flow into the axial groove G from the circumferential grooves 22 move to the groove bottom portion of the axial groove G, and follow the flow of the lubricant oil at a relatively high flow velocity in the circumferential oil groove 20 and are easily discharged to the outside of the bearing from the end surface portion in the bearing width direction (FIG. 6). The foreign matters FM which move along the groove bottom portion of the axial groove G are hardly influenced by the dispersed flow of the lubricant oil flowing along the circumferential groove 22 to the side of the semi-cylindrical bearing 30, and thus smoothly flow inside the axial groove G and are discharged to the outside of the bearing from the end surface portions in the bearing width direction.

As a result, according to the sliding bearing of the present embodiment using the semi-cylindrical bearing 10 having the second curved surfaces 18, the influence of the foreign matters accompanying the lubricant oil can be reduced as compared with the conventional sliding bearing in which the foreign matters FM move only along the circumferential oil groove 20, move to the sliding surface region of the semi-cylindrical bearing 30 by the momentum of the lubricant oil flow, and are concentrated and accumulated in the local portion of the region, and then are embedded in the sliding surface region.

The circumferential groove 22 communicates with the axial groove G in one of the slant surfaces 14a which define the axial groove G. As for the groove depths of the circumferential groove 22 and the axial groove G in the communication portion, the depth of the circumferential groove 22 immediately before the intersection portion in which the both grooves intersect each other is compared with the depth of the axial groove G which is defined with reference to the virtual surfaces formed in the intersection portion by extending the second curved surfaces 18 and 38 of the semi-cylindrical bearings 10 and 30.

Further, in FIG. 5, a number of circumferential grooves 22 are illustrated only in the second curved surfaces 18. However, a number of similar circumferential grooves directed in the circumferential direction, while they are not illustrated, also exist actually in the first curved surface 16.

The invention claimed is:
1. A sliding bearing for an internal combustion engine for supporting a crankshaft, comprising
   a pair of semi-cylindrical bearings combined with each other into a cylindrical body to support a crankshaft, a circumferential oil groove being formed to extend in a circumferential direction on an inner circumferential surface of one of the semi-cylindrical bearings, wherein each of inner circumferential surfaces of the respective semi-cylindrical bearings comprises first and second curved surfaces following two kinds of arcs with different curvatures, the first curved surface being in a region including a circumferential central portion of the inner circumferential surface, the second curved surfaces being in remaining two regions of the inner circumferential surface which connect to the first curved surface region and extend toward both circumferential ends of the semi-cylindrical bearing, and a relationship of a center (C1) of a first arc which forms the first curved surface and a center (C2) of a second arc which forms the second curved surface being such that the center (C2) of the second arc is located on a perpendicular line to a bearing bore diameter center line passing through the center (C1) of the first arc, and is located outside from the center (C1), that is, is located at a position displaced to a side of the semi-cylindrical bearing which is a counterpart to be combined, wherein the second curved surfaces are formed in a region in which a circumferential angle (θ) is between 20° at a minimum value and 50° at a maximum value, the circumferential angle (θ) being measured from a circumferential end surface of each of the semi-cylindrical bearings with the center (C1) of the first arc as a center, wherein both of the inner circumferential surfaces comprising the first and the second curved surfaces are sliding surfaces in which a number of microscopic circumferential grooves are formed, groove depths of the circumferential grooves of the second curved surfaces being larger than groove depths of the circumferential grooves of the first curved surface, wherein a bearing wall thickness (W1) in a circumferential central portion of the semi-cylindrical bearing is larger than a bearing wall thickness (W2) in a circumferential end portion, wherein an axial groove for a lubricant oil extends over an entire width of the sliding bearing exists along both butted end surfaces of the pair of semi-cylindrical bearings which are combined into a cylindrical shape, wherein the circumferential oil groove and the axial groove communicate with each other, a cross-sectional area of the circumferential oil groove in the communication portion being larger than a cross-sectional area of the axial groove, wherein the circumferential grooves of the second curved surfaces and the axial groove communicate with each other, groove depths of the circumferential grooves of the second curved surfaces and the axial groove in the communication portion being different from each other, and groove bottoms of the circumferential grooves of the second curved surfaces being displaced to a side of the bearing inner circumferential surface from a groove bottom of the axial groove, and wherein the axial groove is defined by a slant surface extending from the inner circumferential surface of at least one semi-cylindrical bearing of the pair of the semi-cylindrical bearings to the circumferential end surface.

2. The sliding bearing for an internal combustion engine for supporting a crankshaft according to claim 1,
wherein the circumferential oil groove is located in the center of a width of the semi-cylindrical bearing.

3. The sliding bearing for an internal combustion engine for supporting a crankshaft according to claim 1,
wherein the circumferential grooves of the second curved surface have groove depths of between 4 μm and 15 μm with pitches of between 0.1 mm and 0.8 mm, and the circumferential grooves of the first curved surface have groove depths of 3 μm or less with pitches of between 0.1 mm and 0.8 mm.

4. The sliding bearing for an internal combustion engine for supporting a crankshaft according to claim 1,
wherein a difference "W1-W2" between the bearing wall thickness (W1) in the circumferential central portion of the semi-cylindrical bearing and the bearing wall thickness (W2) in the circumferential end portion is between 5 μm and 30 μm.

5. The sliding bearing for an internal combustion engine for supporting a crankshaft according to claim 1,
wherein a difference "W1-W2" between the bearing wall thickness (W1) in the circumferential central portion of the semi-cylindrical bearing and the bearing wall thickness (W2) in the circumferential end portion is between 5 μm and 15 μm.

6. A sliding bearing device including a sliding bearing for an internal combustion engine for supporting a crankshaft, comprising a pair of semi-cylindrical bearings combined with each other into a cylindrical body to support a crankshaft, a circumferential oil groove being formed to extend in a circumferential direction on an inner circumferential surface of one of the semi-cylindrical bearings, wherein each of inner circumferential surfaces of the respective semi-cylindrical bearings comprises first and second curved surfaces following two kinds of arcs with different curvatures, the first curved surface being in a region including a circumferential central portion of the inner circumferential surface, the second curved surfaces being in remaining two regions of the inner circumferential surface which connect to the first curved surface region and extend toward both circumferential ends of the semi-cylindrical bearing, and a relationship of a center (C1) of a first arc which forms the first curved surface and a center (C2) of a second arc which forms the second curved surface being such that the center (C2) of the second arc is located on a perpendicular line to a bearing bore diameter center line passing through the center (C1) of the first arc, and is located outside from the center (C1), that is, is located at a position displaced to a side of the semi-cylindrical bearing which is a counterpart to be combined, wherein the second curved surfaces are formed in a region in which a circumferential angle (θ) is between 20° at a minimum value and 50° at a maximum value, the circumferential angle (θ) being measured from a circumferential end surface of each of the semi-cylindrical bearings with the center (C1) of the first arc as a center, wherein both of the inner circumferential surface comprising the first and the second curved surfaces are sliding surfaces in which a number of microscopic circumferential grooves are formed, groove depths of the circumferential grooves of the second curved surfaces being larger than groove depths of the circumferential grooves of the first curved surface, wherein a bearing wall thickness (W1) in a circumferential central portion of the semi-cylindrical bearing is larger than a bearing wall thickness (W2) in a circumferential end portion, wherein an axial groove for a lubricant oil extends over an entire width of the sliding bearing exists along both butted end surfaces of the pair of semi-cylindrical bearings which are combined into a cylindrical shape, wherein the circumferential oil groove and the axial groove communicate with each other, a cross-sectional area of the circumferential oil groove in the communication portion being larger than a cross-sectional area of the axial groove, wherein the circumferential grooves of the second curved surfaces and the axial groove communicate with each other, groove depths of the circumferential grooves of the second curved surfaces and the axial groove in the communication portion being different from each other, and groove bottoms of the circumferential grooves of the second curved surfaces being displaced to a side of the bearing inner circumferential surface from a groove bottom of the axial groove, and wherein the axial groove is defined by a slant surface extending from the inner circumferential surface of at least one semi-cylindrical bearing of the pair of the semi-cylindrical bearings to the circumferential end surface.

\* \* \* \* \*